United States Patent Office 2,970,979
Patented Feb. 7, 1961

2,970,979

VINYL CHLORIDE COMPOSITIONS HAVING IMPROVED IMPACT STRENGTH

Adrianus J. W. Meder and Nellius G. Kramer, Pernis, Netherlands, assignors to Shell Oil Company, New York, N.Y., a corporation of Delaware No Drawing. Filed Mar. 24, 1958, Ser. No. 723,156
Claims priority, application Netherlands Mar. 27, 1957

1 Claim. (Cl. 260—45.5)

This invention relates to novel vinyl chloride polymer compositions, and relates more particularly to hard vinyl chloride polymer compositions containing modifying agents imparting improved impact strength thereto.

In a particular aspect, the invention provides improved hard vinyl chloride polymer compositions of improved impact strength comprising vinyl chloride polymer containing at least 75% vinyl chloride units having incorporated therewith not more than 25 parts per 100 parts of vinyl chloride polymer of a rubbery modifying agent.

Polyvinyl chloride possesses a combination of physical properties rendering it particularly suitable for the manufacture of certain plastic articles, such as tubing and the like, therefrom. However, polyvinyl chloride polymers, as heretofore commercially available, generally possess properties which limit considerably their use in important fields of applications. The polyvinyl chloride made by conventional methods available heretofore generally possesses poor impact strength and is therefore unsuitable for the manufacture of rigid articles, particularly those which must be subjected to blows or impact during the course of use.

The addition of certain plasticizers in quantities of about 25 to 100 parts per 100 parts of polymer in some cases improves the impact strength of the vinyl chloride polymers. The articles prepared from this plasticized polymer, however, are soft and flexible and unsuited for use in manufacturing hard, substantially rigid articles. Moreover, the tensile strength and softening temperature of these materials are greatly reduced by the addition of such plasticizers.

It is an object of the present invention to provide improved vinyl chloride polymer compositions obviating to at least a substantial degree such difficulties. It is a further object of the invention to provide vinyl chloride compositions having superior impact strength and a method for its production. A further object of the invention is to provide improved vinyl chloride polymer compositions which have good impact strength and still retain hardness and rigidity. It is a further object of the invention to provide an improved polyvinyl chloride which has excellent impact strength, still retains good tensile strength and possesses a high softening point. Other objects and advantages of the invention will be apparent from the following detailed description thereof.

It has now been found that these and other objects of the invention are obtained by incorporating with a vinyl chloride polymer containing at least 75% vinyl chloride units from about 7 to about 13 parts per 100 parts of vinyl chloride polymer of a modifying agent. The modifying agent consists of butadiene-styrene copolymer containing no more than 30% styrene in polymerized form and a polymer of 2-chlorobutadiene-1,3.

These compositions are found to have unexpectedly high impact strengths. Hard rigid articles prepared therefrom can withstand considerable impact without breaking. Further, the compositions still possess good tensile strength and high softening points, properties which heretofore generally have been lost by the addition of plasticizing agents.

The vinyl chloride polymers used in preparing the compositions of the invention include the homopolymer of vinyl chloride, i.e. polyvinyl chloride, and copolymers of vinyl chloride with monoethylenically unsaturated monomers wherein the copolymer contains at least 75% by weight of vinyl chloride units. The materials to be used with the vinyl chloride may be exemplified by vinyl acetate, vinylidene chloride, diethyl fumarate, methyl methacrylate, methacrylonitrile, acrylonitrile, styrene, allyl alcohol, ethylvinyl succinate, allyl ethyl phthalate, vinyl benzoate, allyl acetate, and the like and mixtures thereof.

Particularly preferred vinyl chloride polymer starting materials comprise polyvinyl chloride and copolymers of vinyl chloride with members of the group consisting of ethylenically unsaturated esters, vinylidene chloride, styrene and acrylonitrile.

Vinyl chloride polymers having molecular weights of from about 15,000 to about 200,000 (as measured by Staudinger method described in Ind. Eng. Chem. 36, page 1152 (1936)), may be used. However it is preferred to use polymers having a molecular weight between 25,000 and 150,000. Preferred polyvinyl chloride used in preparing the compositions of the invention have K-values between about 66 and about 74.

The polymeric modifying agents added to the vinyl chloride polymer to obtain the polymeric compositions of the invention comprise blends of butadiene-styrene copolymers containing not more than 35% styrene with dissimilar diene polymers. The polymeric modifying agents are added to the vinyl chloride polymer in an amount from about 7 to about 13 parts of the polymeric modifying agent per 100 parts of the vinyl chloride polymer.

The butadiene-styrene copolymers employed as modifying agents for the vinyl chloride polymers may be obtained from any suitable source and may be prepared by conventional means. Thus, they may be the product of high-temperature polymerization, that is, polymerization at 45°–50° C., often referred to as "hot rubber," or they may be the product of low-temperature polymerization, that is, at temperatures of from about 0° to about 5° C. The use of the "hot-rubber" type of butadiene-styrene copolymer is generally preferred. The suitable butadiene-styrene copolymers comprise the butadiene-styrene copolymers which are manufactured commercially under such names as GRS and the like.

Incorporation of the butadiene-styrene copolymer with the vinyl chloride polymer within the above-prescribed amounts results in vinyl chloride polymer compositions having substantially improved impact strength. Still greater improvement in impact strength is obtainable, however, by substituting for a portion of the butadiene-styrene polymeric modifying agent a dissimilar diene polymer. The added dissimilar diene polymer has been found to be synergistic with respect to the effect upon the impact strength of the resulting modified vinyl chloride polymer composition. The resulting mixture comprising both the butadiene-styrene copolymer and the dissimilar diene polymer generally have impact strength characteristics which are superior to those compositions comprising only the butadiene-styrene copolymer or only the dissimilar diene polymer. The addition of both the butadiene-styrene copolymer and the dissimilar diene polymer to the vinyl chloride polymer results in compositions having unusually high impact strength characteristics even at relatively low temperatures.

The proportion of butadiene-styrene polymeric modifying agent which is replaced by the dissimilar diene polymer may vary considerably within the scope of the invention. The proportion of the dissimilar diene polymer to butadiene-styrene copolymer preferably employed will depend to some extent upon the specific vinyl chloride polymer with which the polymeric modifying agent is combined, and the degree of impact strength improvement desired. In general the dissimilar diene polymer may constitute, for example, from about 10 to about 75% by weight of the mixed modifying agent. Higher or lower amounts of the dissimilar diene polymer may, however, be used within the scope of the invention. It is to be stressed, however, that the total amount of combined butadiene-styrene copolymer and dissimilar polymer added to the vinyl chloride polymer does not exceed 25 parts per 100 parts of the vinyl chloride polymer with which it is combined.

The dissimilar diene polymers substituted for a portion of the butadiene-styrene copolymer added to the vinyl chloride polymer to obtain the compositions of the invention are chloroprene polymers.

Suitable dissimilar diene copolymers which are mixed with the butadiene-styrene copolymer to form a suitable polymeric modifying agent for the vinyl chloride polymers in accordance with the invention comprise chloroprene polymers such as, for example, the homopolymer of 2-chloro-butadiene-1,3 (chloroprene) and the copolymers of 2-chloro-butadiene-1,3 with other monomers. The suitable chloroprene polymers comprise the synthetic rubbers sold commercially under the name of neoprene rubbers, including GR-M, neoprene type Gn, neoprene type E, neoprene FR and the like.

Preferred neoprene rubbers used in the preparation of the compositions of the invention comprise the polychloroprenes which have not been modified by the incorporation therewith of sulfur, such as neoprene-W. Exceedingly good results are obtained with slightly crystalline forms of polychloroprene not modified with sulfur, e.g., neoprene-WRT. Although not equivalent to the above-mentioned preferred types of chloroprene polymers in the ability to improve impact strength of vinyl chloride polymer polychloroprene modified by the incorporation therein of sulfur, as neoprene-GRT, nevertheless, enables substantial increase in impact strength of the vinyl chloride polymer when employed in conjunction with the butadiene styrene-copolymer, and its use is comprised within the scope of the invention. Suitable chloroprene polymers comprise copolymers of chloroprene with acrylonitrile.

Optimum results with respect to impact strength improvement of vinyl chloride polymer are obtained with the use of the polymeric modifying agent comprising butadiene-styrene copolymer and the chloroprene polymer in an amount of from about 7 to about 13, and preferably from about 9 to about 11 parts, by weight of the polymeric modifying agent per 100 parts of the vinyl chloride polymer.

The ratio by weight of the butadiene-styrene copolymer to the chloroprene polymer component is preferably maintained in the range of from 100:20 to about 60:100.

A particular advantage of the invention resides in the use of the chloroprene polymer in combination with substantial amounts of the less costly butadiene-styrene copolymer. Since the effect of the components when used in combination is superior to each used alone the use of the relatively costly chloroprene polymers for this purpose is now brought within the realm of practicability.

The polymeric modifying agent is added to the vinyl chloride polymer material at any suitable time either during or after its preparation. Thus the modifying agent may be added, for example, immediately after the polymerization of the vinyl chloride monomer or immediately before the manufacture of hard, substantially inflexible articles therefrom.

The polymeric modifying agent may be combined with the polyvinylchloride polymer material while both are in the form of a powder or coagulate, or they may be incorporated with one another by combining one component in the form of a latex with the other in the form of a powder or coagulate. Because of its simplicity, and to avoid affecting adversely desirable qualities of the polymeric components in their effect upon the properties of the composition formed therewith, the polymeric modifying agent and the vinyl chloride polymer materials are preferably admixed as such. For example, they may be combined with one another in any desirable manner whereby intimate mixing of the materials is obtained. Thus, they may be mixed, for example, in a masticator or on rolls heated to temperatures in the range of, for example, from about 150° to about 175° C.

Further ingredients, such as fillers, pigments, stabilizers, lubricants, etc., may be incorporated into the mixture. Examples of stabilizers are organic compounds containing inorganic elements, tribasic sulfate, dibasic lead stearate, epoxy compounds and the like. Lubricants which may be used are, for example, calcium stearate, glycerol mono-oleate and monostearate, cadmium stearate and octadecyl alcohol.

Although the invention is applicable to the improvement of impact strength of vinyl chloride polymer materials broadly it is applied with particular advantage in the improvement of the impact strength of polyvinyl chloride obtained by emulsion polymerization.

It has been found that the temperatures at which the polymeric modifying agent is admixed with the vinyl chloride polymer material will often influence the properties of the resulting polymeric product. Generally the lower the temperature of admixing (above about 150° C.) the higher will be the impact strength of the resulting mixture. A minimum temperature of 150° C. is preferably observed in effecting the admixing of the polyvinyl chloride polymer materials with the polymeric modifying agent. During the mixing of the components the optimum sheet rolling temperature generally lies between about 160° and 190° C.

The compositions prepared in accordance with the invention may be worked up in the usual manner, e.g., by extrusion, injection molding, molding, rolling, etc., into shaped articles, which in addition to the improved impact strength, possess all the desirable properties of articles manufactured from hard vinyl chloride polymer.

To illustrate the manner in which the invention may be carried out the following examples are given. It is to be understood that the examples are for the purpose of illustration and that the invention is not to be regarded as limited to specific compounds or conditions recited therein. Unless otherwise indicated, values disclosed as parts in the examples are parts by weight.

EXAMPLE I

In a plurality of operations 100 parts of polyvinyl chloride (emulsion polymerizate having a K-value of approximately 71) were mixed on a roller mill with varying amounts of butadiene-styrene copolymer (see Table I) prepared at a low temperature and containing 23% by weight of styrene. The roller temperature was approximately 165° C., the mixing time approximately 15 minutes. Test pieces were made of the resulting homogenized plastic masses in order to determine the Izod impact strength at 0° and 23° C. (ASTM D256–47T). The results are shown in the following Table I.

Table I

| Parts of butadiene-styrene copolymer per 100 parts of polyvinyl chloride | Izod (kg.-cm./sq. cm.) at— | |
|---|---|---|
| | 0° C. | 23° C. |
| 0 | | 6 |
| 5 | 5 | 12 |
| 7 | 8 | 31 |
| 9 | 9 | 32 |
| 11 | 10 | 33 |
| 13 (Composition X) | 7 | 16 |

The results show that in the above operations an optimum increase in the impact strength is obtained with approximately 11 parts of the rubbery additive.

When starting polyvinyl chloride, as such, had a tensile strength of 520 kg./sq. cm. and a heat distortion point of 72° C., the tensile strength of the resulting composition containing 13 parts of butadiene-styrene copolymer per 100 parts of polyvinyl chloride (composition X in Table I) was 350 kg./sq. cm. and the heat distortion point 70° C.

For comparison an experiment was carried out in which 10 parts of a copolymer of butadiene and styrene, having a styrene c content of 75% by weight, were incorporated on a roller mill with 100 parts of polyvinyl chloride. The impact strength of the resulting composition at 23° C. was 4 kg./sq. cm. and at 0° C. 3 kg.-cm./sq. cm. This shows the higher impact strength obtainable with butadiene-styrene copolymer modifying agents according to the invention.

EXAMPLE II

In a plurality of operations polyvinyl chloride (emulsion polymerizate having a K-value of approximately 71) was mixed on a roller mill with a rubbery modifying agent consisting of a mixture of a butadiene-styrene copolymer (GRS) and neoprene-WRT. The rolling temperature was approximately 165° C., the mixing time approximately 15 minutes. In preparing the modifying agents two different butadiene-styrene copolymers were used: (1) GRS-1006 rubber prepared at elevated temperature polymerization conditions and containing 23% by weight of bound styrene, and (2) GRS-1500 prepared at low-temperature polymerization conditions and containing 23% by weight of bound styrene. The rolling temperature was approximately 165° C. and the mixing time approximately 15 minutes.

The composition of the rubbery modifying agent, and the amount of the modifying agent combined with polyvinyl chloride is set forth in the following Table II.

Small test pieces were made from the homogenized plastic masses so produced and the Izod impact strength at 0° and 23° C. (ASTM D256-47) determined. The results are shown in the Table II below.

Table II

| Ratio by wt. of copolymers in the rubbery modifying agent | Parts of modifying agent per 100 parts polyvinyl chloride | Izod (kg.-cm./sq. cm.) at— | |
|---|---|---|---|
| | | 0° C. | 23° C. |
| 100 GRS-1006: 20 Neoprene | 7 | 3 | 6 |
| | 9 | 13 | 63 |
| | 13 | 26 | 81 |
| 100 GRS-1006: 60 Neoprene | 7 | 13 | 54 |
| | 13 | 25 | 77 |
| 100 GRS-1006: 100 Neoprene | 7 | 15 | 54 |
| | 11 | 25 | 84 |
| | 13 | 24 | 75 |
| 60 GRS-1006: 100 Neoprene | 7 | 16 | 59 |
| | 13 | 30 | 86 |
| 20 GRS-1006: 100 Neoprene | 7 | 9 | 19 |
| | 11 | 15 | 78 |
| | 13 | 12 | 39 |
| 100 GRS-1500: 60 Neoprene | 7 | 7 | 31 |
| | 9 | 12 | 51 |
| | 13 | 8 | 28 |
| 100 Neoprene | 7 | 10 | 30 |
| | 9 | 13 | 29 |
| | 13 | 4 | 16 |
| 100 GRS-1006 | 7 | 14 | 52 |
| | 11 | 11 | 20 |
| | 13 | 6 | 15 |

The tensile strength of a modified polyvinyl chloride composition having 9 parts (per 100 parts of polyvinyl chloride) of rubbery additive (consisting of 100 parts of GRS-1006 and 100 parts of neoprene-WRT) was 420 kg./sq. cm. This shows that with even such a small quantity of rubbery additive a highly desirable improvement of the impact strength can be achieved, while retaining a very satisfactory tensile strength.

The invention claimed is:

A composition comprising a mixture of (1) 100 parts of a vinyl chloride polymer selected from the group consisting of polyvinylchloride and copolymers of at least 75% of vinylchloride and up to 25% of a monoethylenically unsaturated monomer and (2) from about 7 to about 13 parts by weight of a polymeric modifying agent consisting of (a) butadiene-styrene copolymer containing no more than 30% styrene in polymerized form and (b) a polymer of 2-chlorobutadiene-1,3, the ratio by weight of said copolymer (a) to said polymer (b) being in the range of from 100:20 to 60:100.

References Cited in the file of this patent

UNITED STATES PATENTS

| 2,511,113 | La Piana et al. | June 13, 1950 |
| 2,624,683 | Bezman | Jan. 6, 1953 |
| 2,660,194 | Hoffman | Nov. 24, 1953 |
| 2,753,322 | Parks et al. | July 3, 1956 |
| 2,791,600 | Schwaegerle | May 7, 1957 |

FOREIGN PATENTS

| 698,385 | Great Britain | Oct. 14, 1953 |